United States Patent
Ludden et al.

(10) Patent No.: US 6,347,228 B1
(45) Date of Patent: Feb. 12, 2002

(54) LOCATION APPARATUS AND METHOD IN A MOBILE TELECOMMUNICATIONS SYSTEM

(75) Inventors: Brendan Patrick Ludden; Luis Lopes, both of Swindon (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/327,652

(22) Filed: Jun. 8, 1999

(30) Foreign Application Priority Data

Jun. 10, 1998 (GB) ................................. 9812404

(51) Int. Cl.$^7$ .............................. H04Q 7/20; G01S 3/02
(52) U.S. Cl. ................... 455/456; 342/450; 342/463; 342/465
(58) Field of Search ...................... 455/456, 440, 455/441, 457, 435, 432, 433, 414, 560, 418, 461, 417, 517; 342/456, 457, 463, 450, 465

(56) References Cited

U.S. PATENT DOCUMENTS

| | | | |
|---|---|---|---|
| 4,698,781 A | | 10/1987 | Cockerell, Jr. |
| 4,916,455 A | | 4/1990 | Bent et al. |
| 5,317,323 A | | 5/1994 | Kennedy et al. |
| 5,327,144 A | | 7/1994 | Stilp et al. |
| 5,588,042 A | * | 12/1996 | Comer ..................... 455/413 |
| 5,903,844 A | * | 5/1999 | Bruckert et al. ............ 455/456 |
| 5,926,133 A | * | 7/1999 | Green, Jr. .................. 342/450 |
| 6,064,888 A | * | 5/2000 | Lundqvist et al. .......... 455/456 |
| 6,070,083 A | * | 5/2000 | Watters et al. ............. 455/517 |
| 6,097,959 A | * | 8/2000 | Yost et al. .................. 455/456 |
| 6,131,028 A | * | 10/2000 | Whitington ................. 455/435 |
| 6,154,657 A | * | 11/2000 | Grubeck et al. ............ 455/456 |
| 6,230,018 B1 | * | 5/2001 | Watters et al. ............. 455/456 |
| 6,310,576 B1 | * | 10/2001 | Johnson ..................... 342/456 |

FOREIGN PATENT DOCUMENTS

| | | |
|---|---|---|
| EP | 0385600 A2 | 2/1990 |
| EP | 0733912 A2 | 1/1996 |
| GB | 2250154 A | 5/1992 |
| GB | 2310098 A | 8/1997 |
| GB | 2316823 A | 3/1998 |

* cited by examiner

Primary Examiner—Nay Maung
Assistant Examiner—Raymond B. Persino
(74) Attorney, Agent, or Firm—Sayed Hossain Beladi; Lalita P. Williams

(57) ABSTRACT

Apparatus for determining the location of a subscriber unit (1) in a mobile telecommunications network, and particularly in a GSM cellular network, includes the provision of several receiver stations (4, 5, 6) positioned at separate known locations within each cell. Each of the receiver stations (4, 5, 6), which are synchronised by means of an on-board GPS receiver (10), measures the time of arrival of a message transmitted from the subscriber unit (1). The time of arrival measurements recorded by each receiver station (4, 5, 6) are then transmitted to a base transceiver station (2) for computation of the subscriber unit's location relative to the receiver stations. The apparatus can provide a reasonably accurate means for location with a low susceptibility to interference.

8 Claims, 1 Drawing Sheet

LOCATION APPARATUS AND METHOD IN A MOBILE TELECOMMUNICATIONS SYSTEM

FIELD OF THE INVENTION

This invention relates to determining location in mobile communication systems and particularly though not exclusively, to the cellular GSM system (Global System for Mobile Communications), a description of which can be found in the book "The GSM System for Mobile Communications" by M. Mouley and M. Pautet.

BACKGROUND OF THE INVENTION

A cellular radio telephone radio system generally includes a switch controller coupled to the public switched telephone network (PSTN) and a plurality of base stations. Each of the plurality of base stations generally defines a geographic region or "cell" proximate to the base station to produce coverage areas. One or more mobile stations communicate with a base station that facilitates a call between the mobile station and the PSTN. The communication link over a carrier signal from the base station to a mobile station is referred to as the downlink. Conversely, the communication link from a mobile station to the base station is referred to as the uplink.

GSM networks are made up of mobile services switching centers, base station systems and mobile stations. These three entities can be broken down further into smaller entities such as within the base station system there are base station controllers, base transceiver stations and transcoders.

It may be advantageous to determine the location of a mobile station. For example, such information would be useful to emergency, tariffing services and traffic routing services. The accuracy required is dictated by the service for which location determination is needed. For example, for tariffing, an accuracy of 500 meters might be acceptable. However, for the purpose of locating the nearest restaurant, for example, an accuracy of less than 100 meters would be needed. The initial driving force for location determination was the legislation brought out in the United States of America (known as E911) which requires that a mobile station can be located to within 125 meters for 67% of the time for the emergency services. This is to be introduced in stages and is expected to be operational by the year 2001. At present, in countries operating GSM networks there is no such legislation in place. However, the need for location determination in GSM systems is gaining momentum with a plethora of services being anticipated and also location-selective tariffing being proposed.

Most known methods of locating a mobile station in a mobile telecommunications network involve a calculation of the distances between three or more base stations and mobile stations. One known method of estimating the distance between a base station and a mobile station in a GSM network involves measuring the propagation delay incurred by the carrier signal during its return trip from the base station to a mobile station. (See for example, WO-A-9205672). Once the distance between three or more known fixed points and the mobile stations are known, the mobile station's relative position can be calculated. For example, the so-called "circle method" described in WO-A-9205672 is based on measurements of three independent distances. With three given known reference points in a plane, it is possible to establish the co-ordinates of any other point in the same plane using the distances between the reference points and the point in question.

Location of a mobile station by using the known technique based on measurements of propagation delay require that the mobile station is simultaneously visible to at least three base stations. Environmental constraints on the cellular network may not always make this possible.

Thus there is a need for a system and method of location which removes this constraint.

SUMMARY OF THE INVENTION

In one aspect, the present invention consists of apparatus for determining the location of a mobile station in a mobile telecommunications system, the apparatus comprising:
 a computation device,
 a master station, and
 a plurality of slave stations positioned at known locations.

The master station is adapted to communicate with the mobile station and with the plurality of slave stations, Each slave station incorporates synchronization means, a receiver for receiving signals from the mobile station, measuring means for measuring the time of arrival of the signals, and a transmitter for facilitating transmission of the time of arrival measurements to the computation device for calculating the location of the mobile station, said transmission of the time of arrival measurements being at least partly over an uplink channel between the slave stations and the master base station.

The computation device may be located at the master station or at some other remote location. Time of arrival measurements may be transmitted directly to such a remote location or via the master station.

The master station may, in part, comprise a conventional base transceiver station fitted with additional components in accordance with the invention.

The slave stations may comprise a modified form of radio telecommunication handset and may, conveniently, be mounted at the top of lamp posts, for example.

The synchronization means required by each slave station could comprise part of a commercially available GPS receiver (Global Positioning System).

Hence the invention advantageously requires only relatively inexpensive equipment additional to the mobile telecommunication infrastructure. Each base transceiver station in the network would preferably control a minimum of three slave stations (in order to give a reasonably accurate fix on the location of the mobile station) within the cell it serves. Conveniently, one could be co-located with the master station. The slave stations need only be small and can be mounted almost anywhere, preferably at a site with an electrical power supply. They could, of course, be powered by battery or solar cells. Another advantage is that they do not require a dedicated leased telecommunications line.

The invention provides the further advantage in that only one transceiver station needs to be used in the location process. Therefore, in large cells where there may be no or very weak signals from neighbouring base transceivers stations, location estimates can still be performed.

Further, by virtue of this invention, location determination by time of arrival measurements does not require time synchronisation of the entire telecommunications network. This would otherwise have to be done by the additional, complicated method of using a common clock, or establishing a reference station which calculates the time offsets between different components of the network. Using this invention, it is sufficient for just the slave stations peculiar to a cell to be synchronised.

The signals sent by the mobile station to the slave stations can be kept very simple in content, i.e. no large amount of data needs to be transmitted over the network. The signals may comprise conventional "fill-frames" for example.

Further, the data generated by the slave stations e.g. time of arrival measurements can be transmitted in SMS format (short message service), GPRS or USSD. This latter facet enables multiple measurements to be made in order to improve the accuracy of the location computation without putting a prohibitive load on the network.

Hence the location apparatus of the present invention can be "overlaid" on an existing radio communications network and be invisible to it.

Initial control commands may originate from the master station (i.e. a serving base transceiver station in one particular embodiment) or the location procedure can be initiated either by the mobile station or by the controlling network components. (For example, a mobile switching center).

The apparatus can be extended in the cellular network context so that any slave station can be used by any base transceiver station within range.

In a second aspect, the invention consists of a method for determining the location of a mobile station in a mobile telecommunication system, the method including the steps of:

receiving at a plurality of time-synchronised slave station, control signals from a master station, receiving at each of the slave stations signals from the mobile station, measuring at each of the slave stations the time of arrival of the signals, from the mobile station.

transmitting from each of the slave stations the time of arrival measurements to a computation device, and computing in the computation device the location of the mobile station with respect to the slave stations according to the time of arrival measurements.

The method may further comprise the step, in the master station, of receiving a location request from either the mobile station or from a controlling element of the telecommunications network.

In a preferred embodiment, the master station designates particular slave stations for receiving signals from the mobile station and for performing the time of arrival measurements. It may also instruct the mobile station when, at a particular moment in time, to transmit a signal burst.

BRIEF DESCRIPTION OF THE DRAWINGS

Some embodiments of the invention will now be described by way of example only, with reference to the drawings of which.

DESCRIPTION OF A PREFERRED EMBODIMENT

Figure 1:
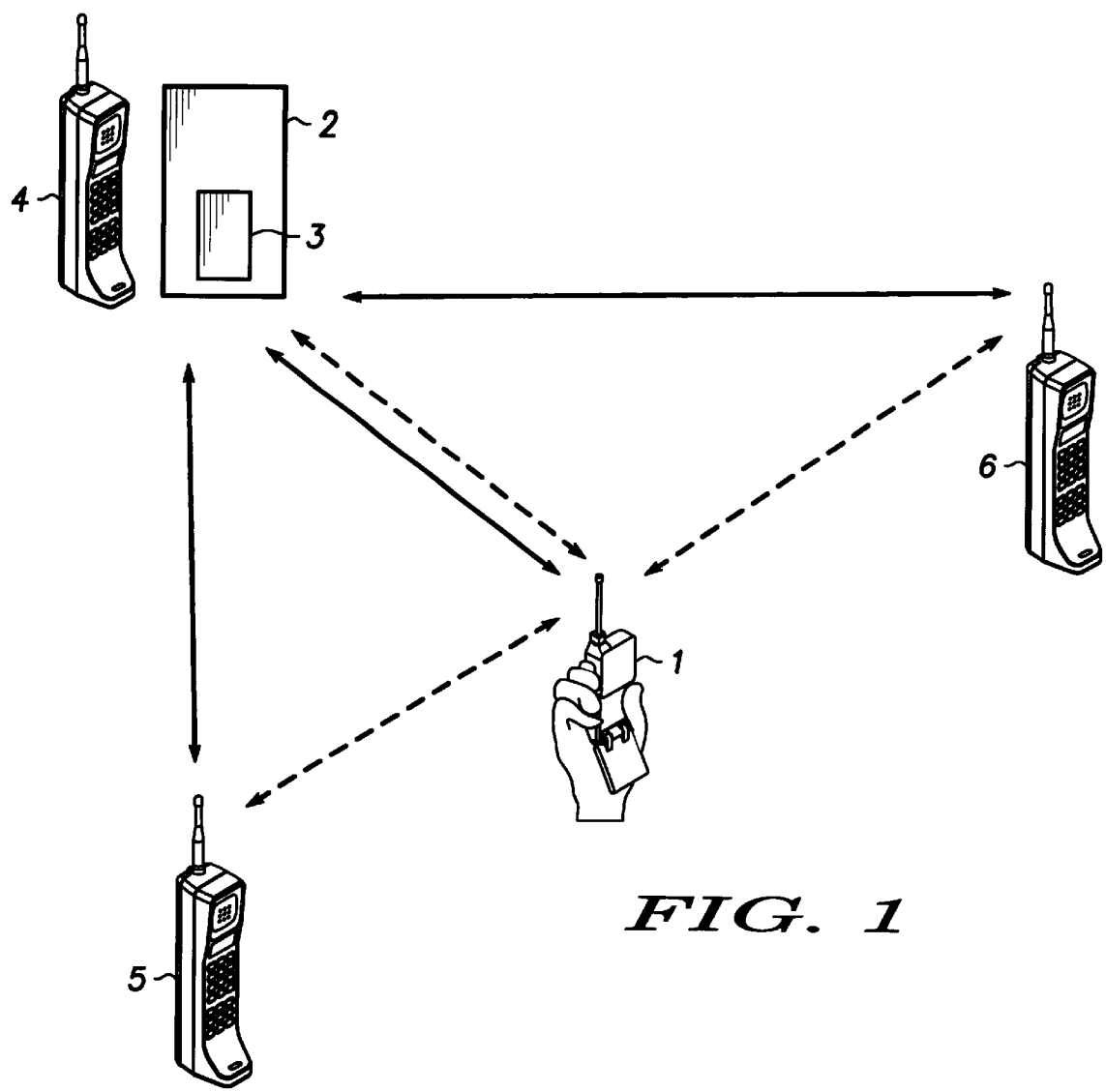
FIG. 1 is a schematic diagram of location apparatus in accordance with the invention and incorporated in a GSM cellular network.

Referring then to FIG. 1, a mobile station 1 is located in a cell served by a base transceiver station (BTS) 2. The BTS 2 incorporates a computation device 3. Co-located with the BTS 2 and powered therefrom is a first slave station 4. Two additional slave stations 5 and 6 are located within the cell and are remote from the BTS 2. Other slave stations may also be located in the cell but only two remote stations are shown here for clarity. Each slave station 4, 5, 6 comprises a modified handset.

The locations of the BTS 2 and all three slave station 4, 5, 6 are known. The location of the mobile station 1 is initially not known at all.

Communications links exist between mobile station 1 and the BTS 2 (on an uplink and a downlink), between the BTS 2 and the slave stations 4, 5, 6 (on an uplink and a downlink) and between the mobile station 1 and the slave stations 4, 5, 6 (on an uplink only).

Figure 2:
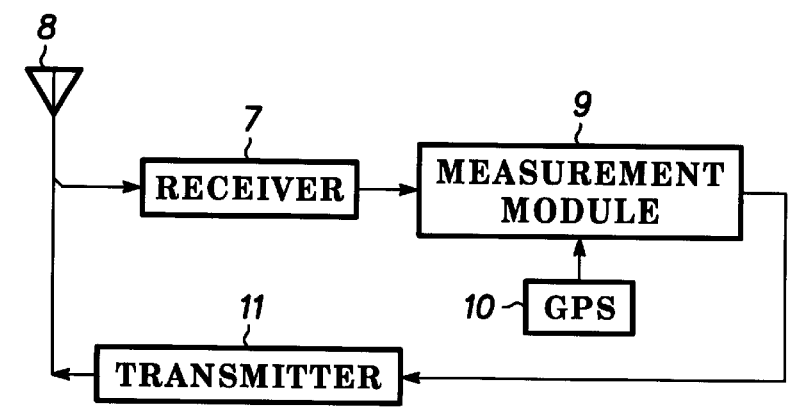
FIG. 2 is a schematic block diagram of the components of a slave station of FIG. 1.

With reference to FIG. 2, each slave station includes the following components. A receiver 7 connected to an antenna 8 receives signals from the mobile station 1. The output of the receiver 7 is fed to a first input of a measurement module 9. A second input of the measurement module is connected to the clock output of a conventional GPS receiver 10 for time synchronisation of each slave station.

The measurement module 9 performs time of arrival measurements on signals received from the mobile station 1 and feeds the measured values to a transmitter 11 for onward transmission via the antenna 8 to the computation device 3 in the BTS 2.

The BTS 2 and the mobile station 1 comprise, for the most part, conventional commercial equipment and function in the conventional manner in addition to facilitating the location operation.

The location apparatus of FIGS. 1 and 2 operates as follows.

The mobile station 1 (or alternatively the GSM network) initiates a location request to the BTS 2. The BTS 2 firstly on reception of the location request either directly or via the GSM network, performs a rough estimate of the position of the mobile station 1 by using data generic to the GSM system. Such data could include power measurement data, timing advance data, sector data, etc.

The BTS 2 then decides which slave stations are to be used in the location estimate. In this example, slave stations 4, 5 and 6 are to be used. The BTS 2 then checks the GPS clock 10 of the co-located slave station 4 and calculates a time for the designated slave stations to start receiving signals from the mobile station 1. This time can be roughly synchronised with the GSM frame structure, timing advance, etc.

BTS 2 then contacts the relevant slave stations 4, 5, 6 via paging or SMS signal, to inform them of the start time of the receiving and measurement process, the frequency the mobile station 1 will transmit on and the GSM time slot. Optionally, each slave station 4, 5, 6 can confirm to the BTS that this message has arrived correctly.

The BTS 2 then instructs the mobile station 1 to transmit a signal burst. The slave stations now have knowledge of the frequency and timing parameters relating to this signal burst and are therefore able to measure time of arrival at the measurement module 9. As all slave stations are synchronised via the GPS receiver clock, the time of arrival measurements will be relatively accurate.

The slave stations 4, 5, 6 then each transmit their time of arrival measurements to the computation device 3 in the BTS 2 via an SMS message. Optionally, the slave stations 4, 5, 6 also transmit to the BTS 2 signal power estimate and signal quality estimate to assist in predicting the accuracy of the computed location of the mobile station 1.

The computation device 3 then calculates the mobile stations location (relative to the slave stations 4, 5, 6) by any one of several known methods, e.g. the aforementioned circle method.

As one of the slave stations 4 is co-located with the BTS 2, the BTS location can be used in the location calculation.

Finally, the BTS 2 transmits the computed location information to the network service provider via a mobile switching center for example.

In an alternative embodiment, the computation device 3 is not located at the BTS 2 but at some other remote location. In this case the BTS 2 forwards the time of arrival measurement on to this remote location.

Location apparatus in accordance with this invention is less susceptible to interference than systems which rely on downlink measurements. This is because downlink measurements systems rely on receiving signals which originate well outside the serving cell.

The sensitivity of the invention may be improved by employing spatial or polarisation diversity techniques. E.g. by receiving and measuring two successive location signal bursts from the mobile station on different antennas incorporated in the slave stations.

We claim:

1. Apparatus for determining the location of a mobile station in a mobile telecommunications system, the apparatus comprising:

a computation device;

a master station, and a plurality of slave stations positioned at known locations;

in which the master station is adapted to communicate with the mobile station and with the plurality of slave stations, and in which each slave station incorporates synchronization means, a receiver for receiving signals from the mobile station, measuring means for measuring the time of arrival of the signals and a transmitter for facilitating transmission of the time of arrival measurements to the computation device for calculating the location of the mobile station, said transmission of the time of arrival measurements being at least partly over an uplink channel between the slave stations and the master base station and using a protocol prescribed for mobile stations communicating with the base station.

2. Apparatus as claimed in claim 1 in which said master station is adapted to perform an estimate of the location of the mobile station and to determine which slave stations to communicate with.

3. Apparatus as claimed in claim 2 in which said master station is configured to generate transmission instructions to the mobile station.

4. A method for determining the location of a mobile station in a mobile telecommunications system, a method including the steps of:

receiving at a plurality of time-synchronized slave stations, control signals from a master station;

receiving at each of the slave stations, signals from the mobile station;

measuring at each of the slave stations, the time of arrival of the signals from the mobile station;

transmitting from each of the slave stations, at least partly over an uplink channel between the slave station and the master base station and using a protocol prescribed for mobile stations communicating with the base station, the time of arrival measurements to a computation device;

and computing in the computation device, the location of the mobile station with respect to the slave stations according to the time of arrival measurements.

5. A method as claimed in claim 4 and further comprising the step of:

in the master station, receiving a location request from the mobile station.

6. A method as claimed in claim 4 and further including the step of, in the master station, instructing the mobile station when to transmit signals to the slave stations.

7. A method as claimed in claim 4 and further including the step of, in the master station, performing an estimate of the location of the mobile station, designating particular slave stations for receiving signals from the mobile station and for performing time of arrival measurements and transmitting a designation message to each designated slave station.

8. A method as claimed in claim 6 and including the further step of, at each slave station, transmitting a message to the master station confirming receipt of the designation message.

* * * * *